United States Patent [19]

Cobb

[11] Patent Number: 4,819,955
[45] Date of Patent: Apr. 11, 1989

[54] MOBILE STORAGE TANK BATTERY

[75] Inventor: James R. Cobb, Oklahoma City, Okla.

[73] Assignee: Incorporated Tank Systems, Inc., Oklahoma City, Okla.

[21] Appl. No.: 52,605

[22] Filed: May 19, 1987

[51] Int. Cl.⁴ .............................. B60P 3/22; B60P 3/40
[52] U.S. Cl. ................................. 280/837; 220/1.5;
   280/766.1; 280/404; 280/43.23; 280/830;
   280/476.1; 414/458
[58] Field of Search .................. 280/5 C, 5 E, 5 R, 7,
   280/423 A, 763.1, 764.1, 766.1, 43.23, 404;
   220/1.5, 71; 296/204; 414/458

[56] References Cited

U.S. PATENT DOCUMENTS

| | | |
|---|---|---|
| 1,067,625 | 7/1913 | Smith . |
| 2,358,190 | 9/1944 | Theriault .......................... 280/5 C |
| 2,558,168 | 6/1951 | Bernstein .......................... 280/5 C |
| 3,243,193 | 3/1966 | Fulmer et al. .................... 280/35 |
| 3,253,668 | 5/1966 | Tantlinger ........................ 180/11 |
| 3,570,694 | 3/1971 | Tantlinger ........................ 214/390 |
| 3,795,336 | 3/1974 | Acker et al. ..................... 280/43.23 |
| 4,135,596 | 1/1979 | Silba ............................... 280/5 C |
| 4,199,298 | 4/1980 | Webre, Jr. et al. ............... 280/43.23 |
| 4,231,709 | 11/1980 | Corsetti ........................... 414/458 |
| 4,297,068 | 10/1981 | Concha ............................ 414/458 |
| 4,318,549 | 3/1982 | Pletcher .......................... 280/5 C |
| 4,452,555 | 6/1984 | Calabro ........................... 410/53 |
| 4,597,437 | 7/1986 | McNabb .......................... 166/79 |

Primary Examiner—David M. Mitchell
Assistant Examiner—Donn McGiehan
Attorney, Agent, or Firm—Dunlap, Codding & Peterson

[57] ABSTRACT

A storage tank battery connectable between a towing frame and a dolly for transport via clevises on the tank battery and apertured plates extending from connecting frames mounted on the towing frame and the dolly. The connecting frame on the towing frame slides vertically on depending legs of the towing frame and the connecting frame on the dolly pivots on one end of the dolly so that the connecting frames can be raised and lowered by hydraulic jacks mounted on the connecting frames. The tank battery includes a rectangular container partitioned into separate tanks and internal and external bolsters, with corrugations of the partitions between tanks and laterally extending rods connected to the walls of the tanks, support the walls of the tanks against hydrostatic pressure of liquids in the battery.

14 Claims, 6 Drawing Sheets

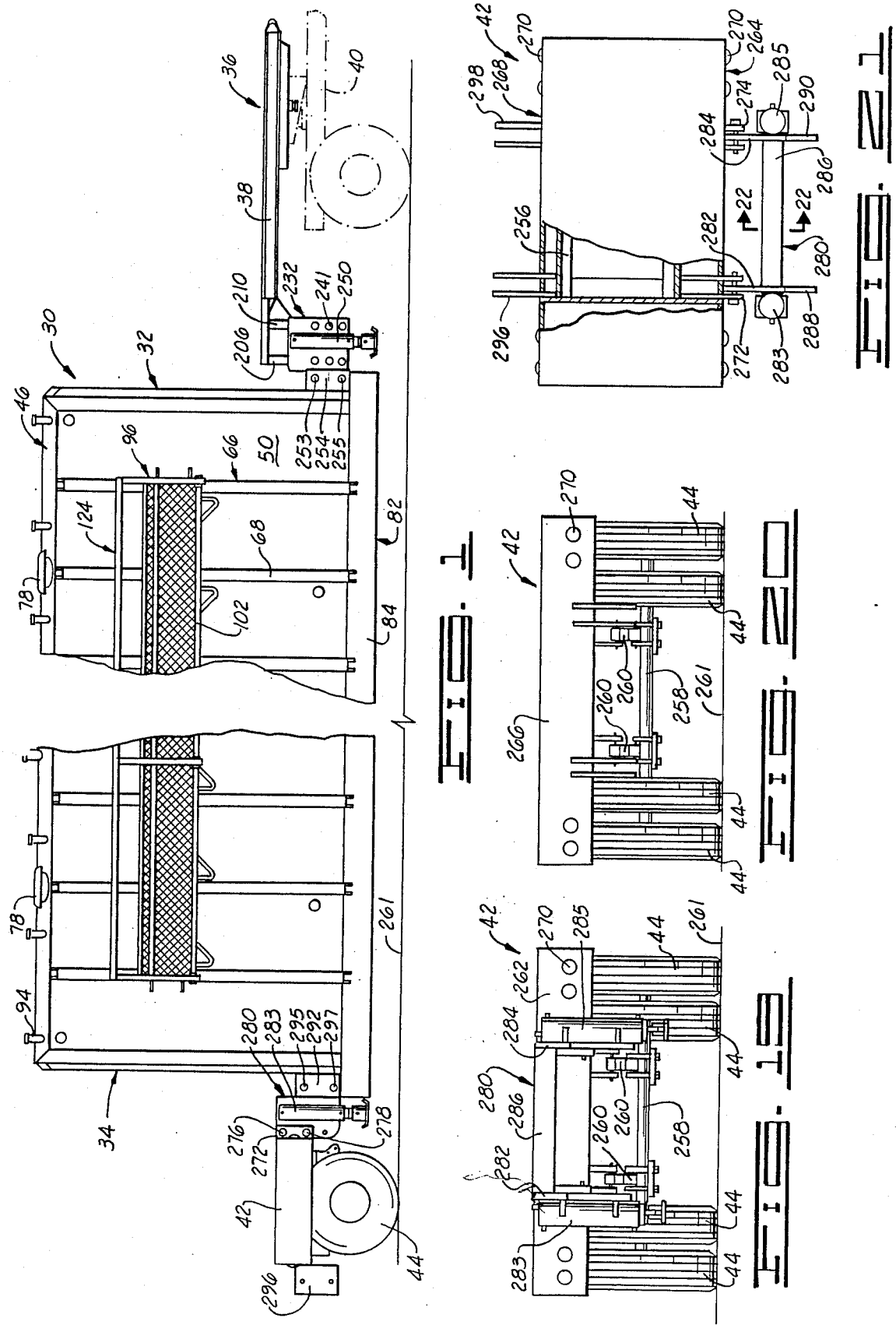

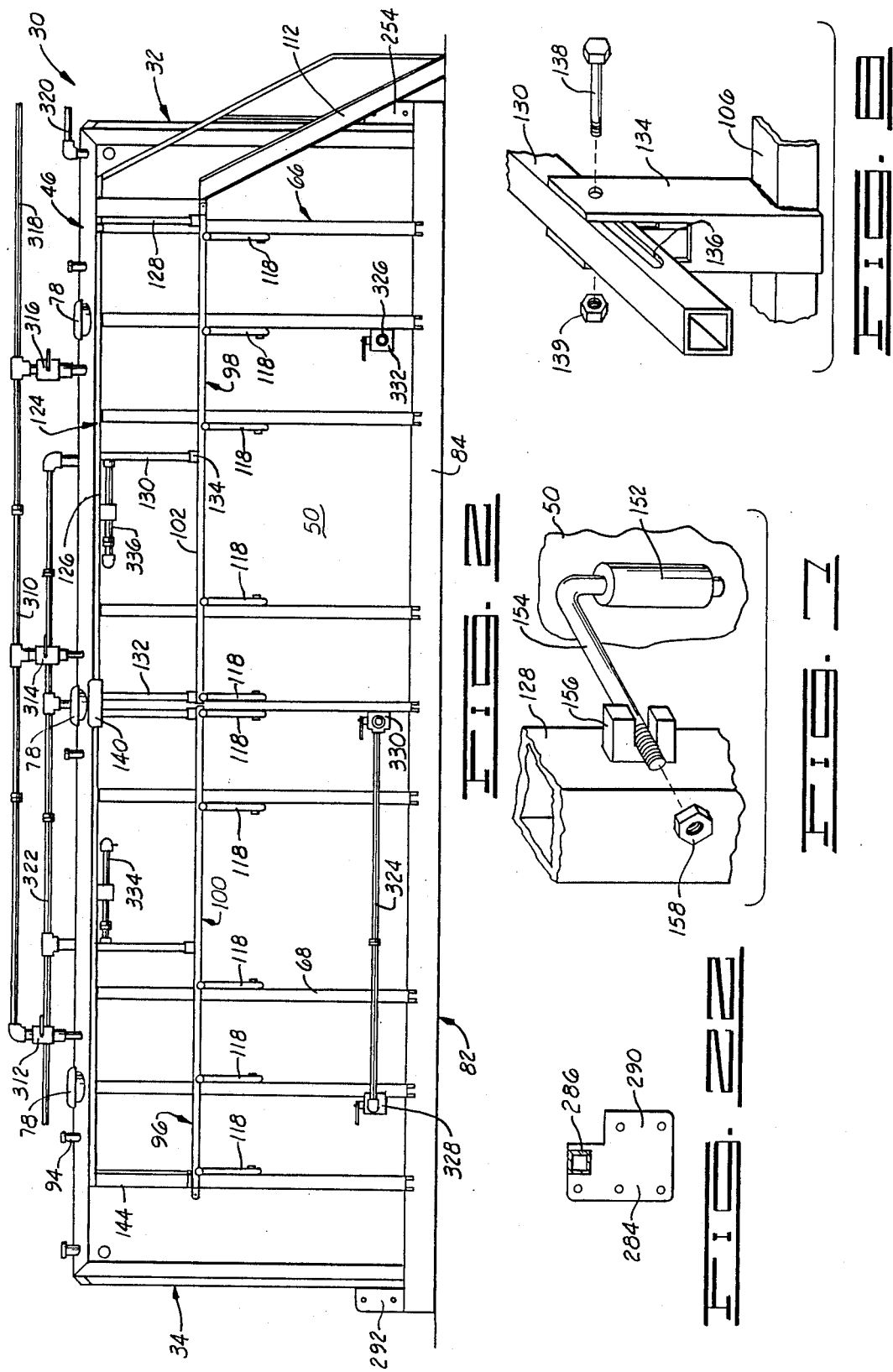

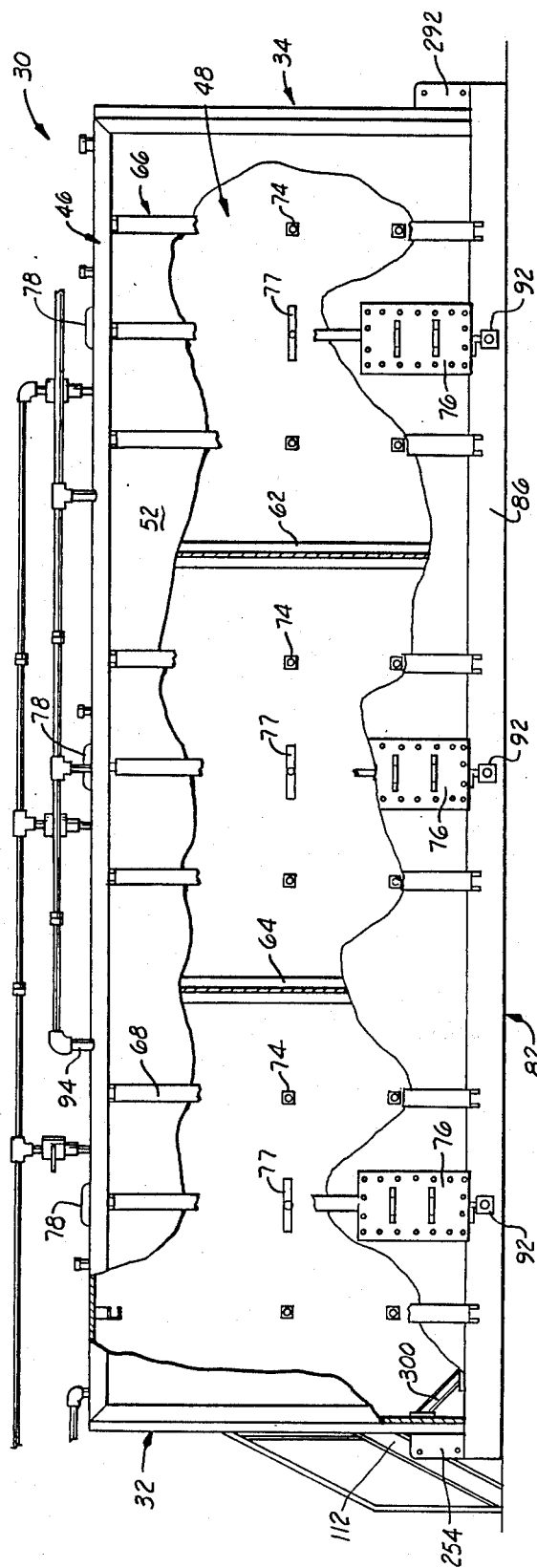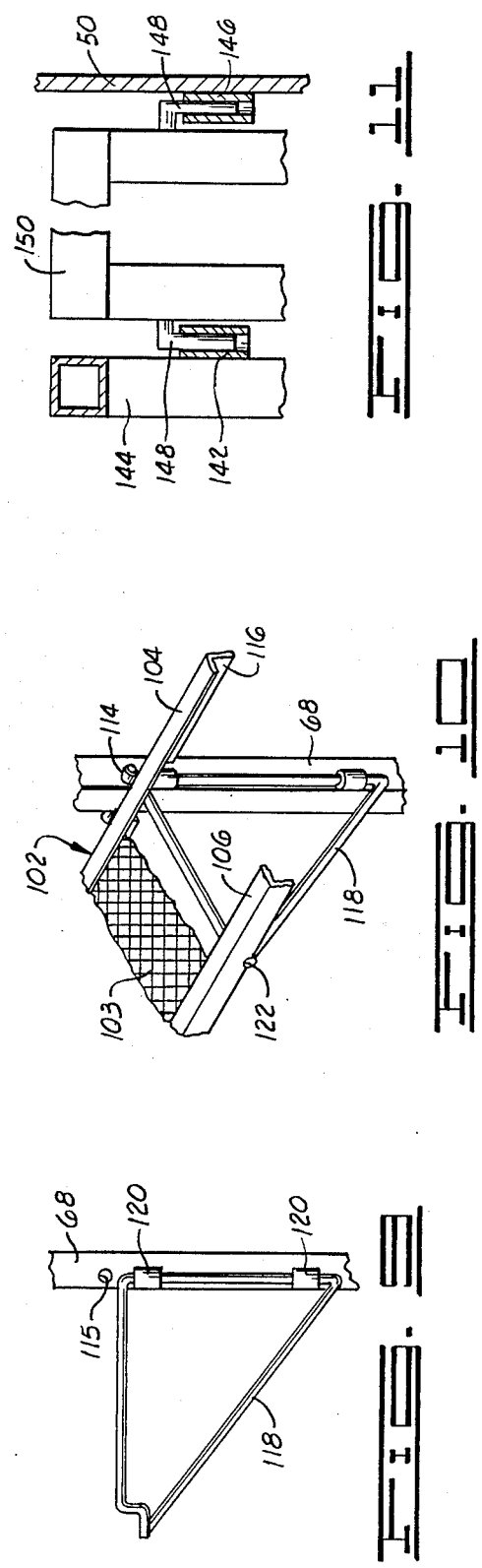

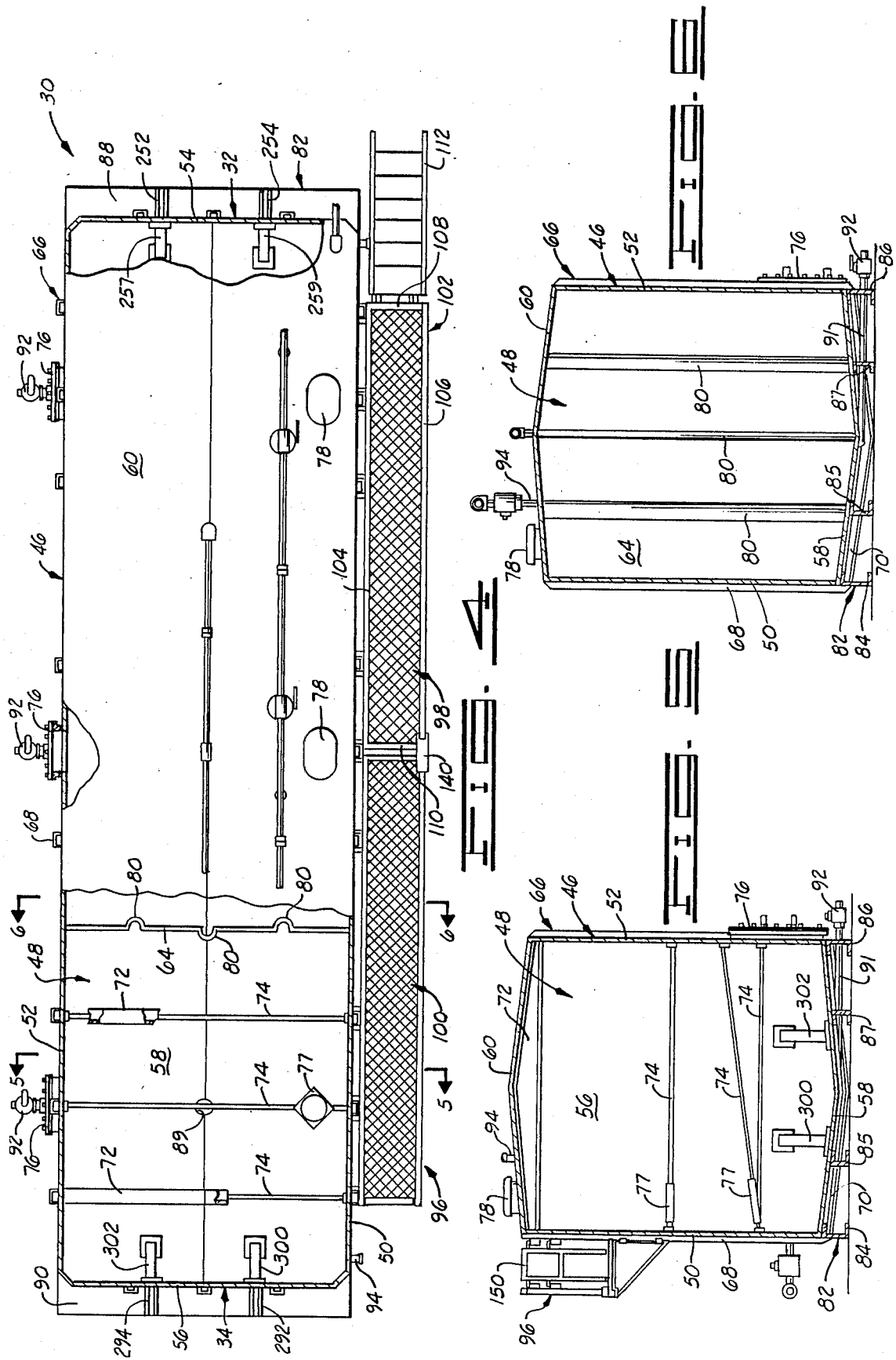

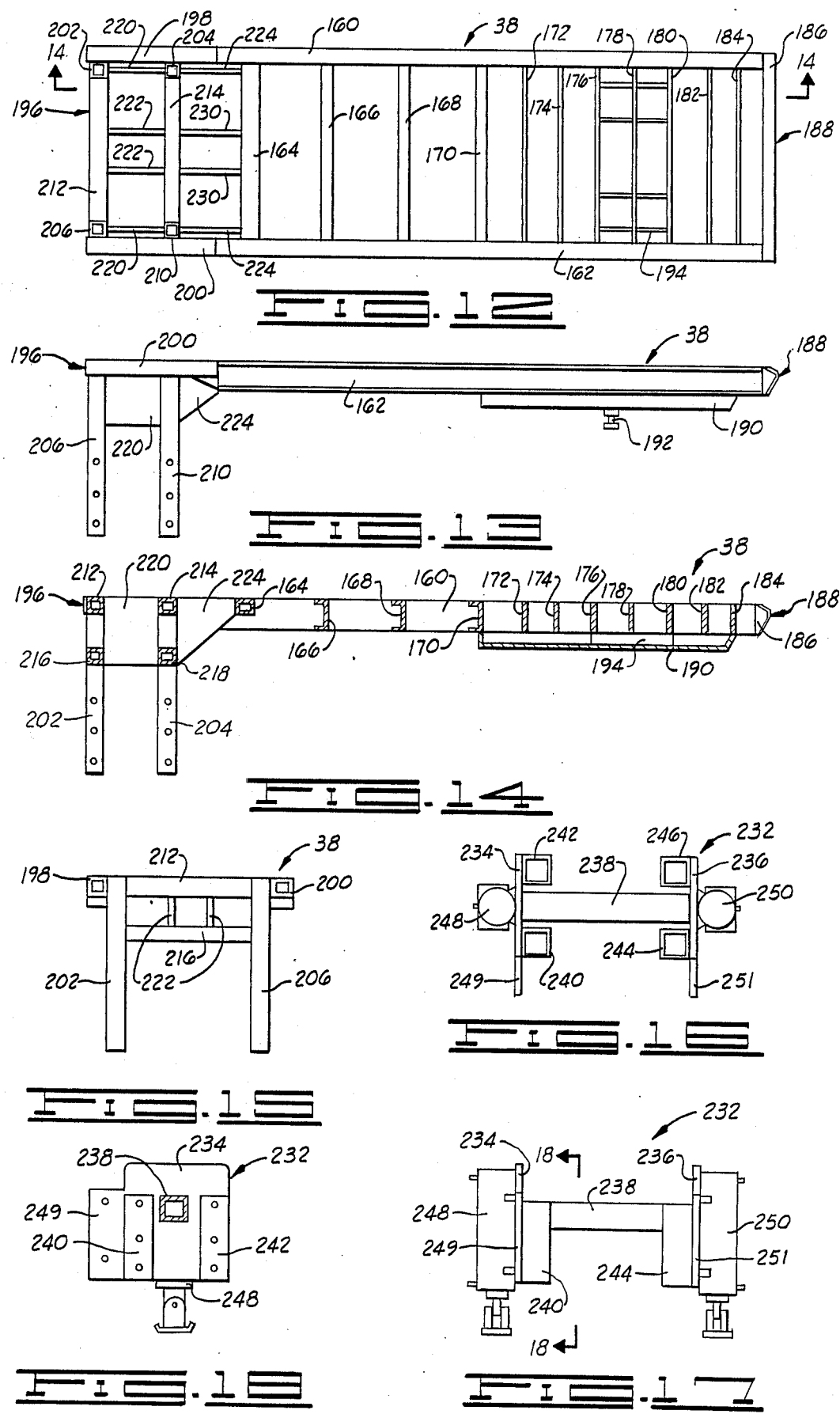

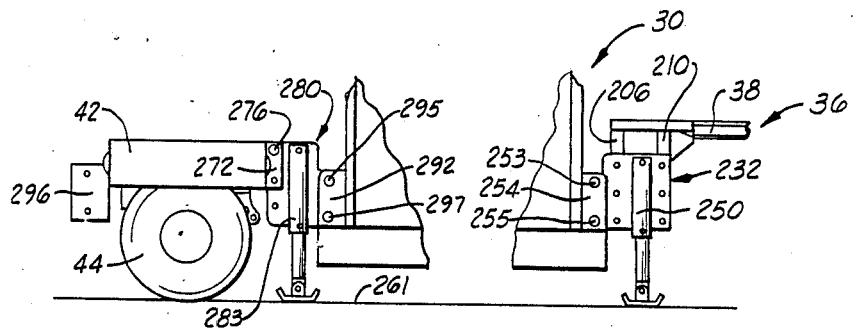
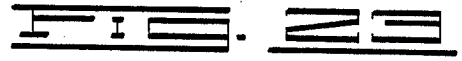
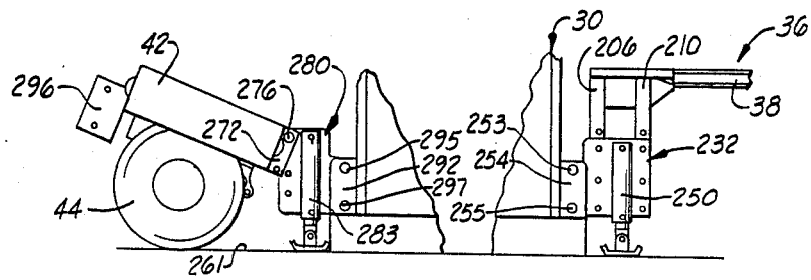
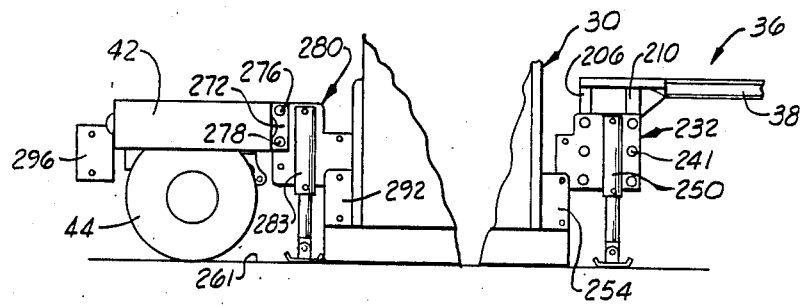
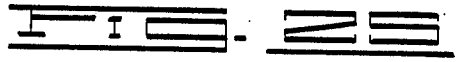
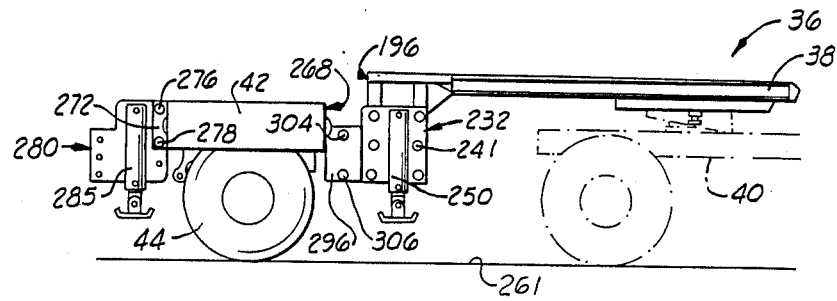
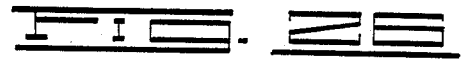

MOBILE STORAGE TANK BATTERY

CROSS-REFERENCE TO RELATED APPLICATION

The subject matter of the present application is related to my co-pending U.S. patent application Ser. No. 052,007 entitled: OIL WELL FLUID PROCESSING SYSTEM, filed on May 19, 1987 and now U.S. Pat. No. 4,779,677.

BACKGROUND OF THE INVENTION

The present invention relates generally to improvements in the mobilization of structures for transport and, more particularly, but not by way of limitation, to the mobilization of oil field storage tank batteries.

When an oil well is brought into production, it will generally produce salt water as well as the oil for which the well was drilled. As noted in my co-pending U.S. patent application entitled "Oil Well Fluid Processing System", it is common practice to separate the oil from the salt water, as well as from natural gas also produced by the well, for storage of the oil and salt water in separate tanks of a tank battery emplaced at the oil well site. The oil is sold from tanks of the battery and the salt water is temporarily stored so that it can subsequently be disposed of without harming the environment.

The storage of the oil and salt water has, in the past, entailed considerable expense. Initially, and with particular reference to the storage of oil, the tanks of the battery have been constructed in the form of cylinders to exploit the rigidity of a cylindrical structure against hydrostatic pressure by liquids it contains. With this rigidity, the volume of the oil in the tank is proportional to the depth of the oil in the tank so that the buyer of the oil can determine the quantity of oil he has purchased by measuring this change in depth and applying an appropriate conversion factor. The other side of the coin is that cylindrical tanks are expensive to construct because of the necessity of bending plate metal from which the tank is constructed into arcuate sections.

Additionally, the construction of tanks in the form of cylinders has resulted in high expenses in the transportation of the tanks to the well site and the emplacement of the tanks to form a tank battery. For transportation purposes, the width of a cylindrical tank is its diameter and the diameter is fixed by the height and volume of the tank. As a result, cylindrical tanks will often present a wide load to be transported. Similarly, cylindrical tanks cannot be packed together into a compact load because of the curvature of their surfaces. As a result, the tanks of storage tank batteries for oil fields have, in the past, been transported to oil fields as individual units which must be individually placed and connected among themselves and to the well prior to use. The interconnection of the tanks is a time consuming job because of the necessity of cutting pipe to lengths that depend upon the placement of the tanks and threading the ends of the pipes for screw connections necessary to prevent leakage. Thus, considerable expense has been associated with both the transportation and the emplacement of the cylindrical tanks that comprise conventional storage tank batteries.

Moreover, it will often occur that the well will not produce oil in sufficient quantity for the continuation of production from the well to be commercially feasible. When this occurs, not only is the initial cost of transporting the tank battery to the well and emplacing the battery for production lost but additional cost is incurred in dismantling the tank battery and transporting the tanks from the site of the well.

SUMMARY OF THE INVENTION

The present invention provides an alternative to conventional tank batteries that greatly reduces the cost of transportation and emplacement of tank batteries at oil well sites. In part, that economy is achieved by a novel construction of the tank battery in the form of a rectangular container that is divided into separate tanks by internal partitions. This construction is achieved without loss of rigidity against hydrostatic pressure that led to the adoption of the cylindrical tank by the industry. In particular, the tank battery of the present invention is comprised of a system of external supports and corrugations of partitions separating individual tanks that provides the walls of the tanks of the tank battery with a rigidity that maintains a fixed relationship between the depth of oil in a tank and the volume of the oil in the tank. Since, with a rectangular construction, the width of the tank battery can be limited without loss of capacity, and since the tanks are transported as a single unit, transportation costs can be greatly reduced. Moreover, since the tanks of the battery are different parts of a single container so that the relative positions of the tanks are fixed, the cost of emplacing the tanks can also be greatly reduced. Specifically, the need to cut pipes to length and thread the ends of the pipes in the field is eliminated. Instead, the pipe can be manufactured at the time the tank battery is manufactured and emplacement of the tank battery then becomes a matter of positioning pre-fitted pipes and making connections therebetween once the battery has been delivered to the oil well site. Moreover, should the well prove to be unproductive, connecting pipes between the separate tanks can be rapidly removed to place the tank in condition for transportation so that the cost of removing the tank battery from the site of an oil well is also reduced.

The economies achieved in the present invention also stem in part from a novel system for mobilizing the tank battery for transport, a system which, additionally, can be utilized to mobilize a variety of other structures for transport. Thus, for example, while the system for mobilizing the tank battery is particularly well suited to that particular use, it is contemplated that such system also be used to transport buildings, shipping containers and the like.

The system for mobilizing structures in general and tank batteries in particular of the present invention includes a towing frame having a coupling frame on one end thereof that can be raised and lowered by jacks mounted on the connecting frame and a means for coupling the connecting frame on the towing frame to one end of the structure to be transported. At the other end of the structure, the system is comprised of a wheeled dolly having a pivoting connecting frame that similarly carries jacks for raising and lowering the connecting frame with respect to the earth's surface and a coupler for attaching the coupling frame to the other end of the tank battery. Thus, by pinning the connecting frames to the dolly and towing frame, the dolly and towing frame can be utilized to support the tank battery while the tank battery is towed along a roadway and, once the tank battery reaches the site of the oil well, the jacks on the connecting frames can be utilized to lower the tank battery to the ground. The couplings between the connecting frames and the tank battery can then be broken and the connecting frames repositioned on the dolly and towing frame for removal of the dolly and towing frame from the oil well site. Thus, the combination of the novel construction of the tank battery and the novel system for mobilizing the tank battery for transport to and from the site of an oil well permits the economical transport of a tank battery to an oil well, the economical emplacement of the tank battery for use, and, should it be necessary, the economical preparation of the tank battery for transport and subsequent economical removal of the tank battery from the site of the oil well.

An object of the present invention is to reduce the costs of providing tank batteries for storing liquids produced by an oil well.

Another object of the invention is to provide a tank battery that can be economically shifted from the site of one oil well to the site of another oil well.

Yet a further object of the invention is to provide a system for mobilizing a structure for transport that can be rapidly employed to place the structure in a road transportable condition and rapidly employed to emplace the structure at a site at which the structure is to be used.

Other objects, advantages and features of the present invention will become clear from the following detailed description of the invention when read in conjunction with the drawings and the appended claims.

BRIEF DESCRIPTION OF THE DRAWINGS

FIG. 1 is a fragmentary side elevational view of the tank battery and transport system therefor in a transport mode of the tank battery.

FIG. 2 is an elevational view of one side of the tank battery in an emplaced mode of the tank battery.

FIG. 3 is an elevational view in partial cutaway of the other side of the tank battery in the emplaced mode of the tank battery.

FIG. 4 is a top view in partial cutaway of the tank battery in the emplaced mode of the tank battery.

FIG. 5 is a cross section of the tank battery taken along line 5—5 of FIG. 4.

FIG. 6 is a cross section of the tank battery taken along line 6—6 of FIG. 4.

FIG. 7 is an exploded view of the mechanism for securing a folding catwalk to the side of the tank battery for transport.

FIG. 8 is an exploded fragmentary view illustrating the connection of a hand rail of the catwalk to a base member thereof.

FIG. 9 is an elevational view of a support for the catwalk.

FIG. 10 is a fragmentary isometric view illustrating the support of a base member of the catwalk.

FIG. 11 is a fragmentary view of a guard rail of the catwalk.

FIG. 12 is a plan view of the towing frame utilized to tow the tank battery in the transport mode of the tank battery.

FIG. 13 is a side elevational view of the towing frame shown in FIG. 12.

FIG. 14 is a cross section of the towing frame taken along line 14—14 of FIG. 12.

FIG. 15 is an end elevational view of the towing frame.

FIG. 16 is a top view of the connecting frame that forms a portion of the towing frame.

FIG. 17 is an end elevational view of the connecting frame shown in FIG. 16.

FIG. 18 is a cross section of the connecting frame of FIG. 16 taken along line 18—18 of FIG. 17.

FIG. 19 is an elevational view of one end of the dolly utilized in the transport of the tank battery.

FIG. 20 is an elevational view of the opposite end of the dolly.

FIG. 21 is a plan view in partial cutaway of the dolly.

FIG. 22 is a cross section of a connecting frame of the dolly taken along line 22—22 of FIG. 21.

FIG. 23 is a fragmentary view of the tank battery and mobilization system therefor illustrating the initial step of emplacing the tank battery.

FIG. 24 is a fragmentary view of the tank battery and mobilization system illustrating a later step in the emplacement of the tank battery.

FIG. 25 is a fragmentary elevational view of the tank battery and mobilization system illustrating a still later step in the emplacement of the tank battery.

FIG. 26 is a side elevational view of the dolly and towing frame subsequent to emplacement of the tank battery illustrating the removal of the towing frame and dolly from the site at which the tank battery is emplaced.

DESCRIPTION OF THE PREFERRED EMBODIMENT

Referring now to the drawings in general and to FIG. 1 in particular, shown therein and designated by the general reference numeral 30 is a mobile storage tank battery constructed in accordance with the present invention. As illustrated in FIG. 1, the tank battery 30 is in a transport mode in which the ends 32 and 34 of the battery 30 are supported by a structure mobilizing system 36 comprised of a towing frame 38 that can be mounted on the fifth wheel of a truck 40 and a dolly 42 having wheels 44 for moving support of the dolly 42 along a roadway.

Referring first to the mobile storage tank battery, and with particular reference to FIGS. 1-6, the battery is comprised of a rectangular container 46 having an interior 48 enclosed by side walls 50 and 52 that extend between end walls 54 and 56 (FIG. 4) at the ends 32 and 34 of the tank battery 30. The bottom of the container 46 is closed by a bottom wall 58 and the top of the container is closed by a top wall 60. For a purpose that will be discussed below, the bottom wall 58 has a V-shaped cross section shown in FIGS. 5 and 6. In the embodiment of the tank battery 30 shown in the drawings, the interior 48 of the container 46 is divided into three separate tanks by internal walls 62 and 64 that parallel the end walls 54 and 56 and are welded to the side walls 50 and 52, the bottom wall 58, and the top wall 60.

When the tank battery 30 is emplaced at the site of an oil well to store oil and salt water, hydrostatic pressure will be exerted on the walls of the container 46 and the tank battery 30 is further comprised of a hydrostatic support system generally designated 66 that supports the walls of the container 46 to maintain a constant relationship between the volume of the tanks of the container as the depth of liquid in the tanks varies. Thus, the external walls of the container 46; that is, the side walls 50 and 52, the end walls 54 and 56, and the bottom and top walls 58 and 60, are supported by external bolsters 68 (only one bolster 68 has been numerically designated in each of the FIGS. 1-6) that are welded to the side walls 50 and 52 and end walls 54 and 56 to extend vertically along the walls 50–56. In the preferred form, the bolsters 68 are lengths of steel channel having side webs (not numerically designated in the drawings) that are welded to the walls 50–56 with the channels of the channel members facing the walls 50–56 to provide a rigid support of the walls 50–56 against bending. As shown in FIGS. 5 and 6, steel I-beams 70 are welded to the bottom wall 58 to provide support for the bottom wall 58 and, as shown in FIGS. 4 and 5, internal bolsters 72 are welded to the top wall 60, each internal bolster aligning with the upper ends of bolsters on the side walls 50 and 52 so that the bolsters 72 coact with bolsters 68 on the side walls 50 and 52 to provide a series of inverted U-shaped frames that extend upwardly along the sides of the container 46 and across the top thereof to prevent distortion of the walls of the container 46 arising from hydrostatic pressure of liquids in the tank battery 30 that might otherwise cause a variation in the relationship between volume and depths of liquids in the tank battery 30 as depths of liquid in the tanks of the tank battery 30 vary. Additional support for the side walls 50 and 52 is provided by a plurality of rods 74 that are attached at their opposite ends to the side walls 50 and 52 to extend laterally across the interior of the container 46. As shown in FIGS. 4 and 5, selected ones of the rods 74, aligned with inspection hatches 76 mounted on the wall 52, extend at an angle to the horizontal to permit access to the tanks of the tank battery 30. Additionally, such rods and rods thereabove incorporate apertured plates 77 that provide a clear path from the bottom wall 58 to the top wall 60 so that liquid in any tank of the tank battery 30 can be sampled at any depth via a small container, commonly referred to as a thief, that can be lowered into the container 46 through any one of a plurality of thief hatches 78 formed in the top wall 60 of the container 46.

In order to support hydrostatic pressure between tanks of the container 46 arising from differences in the level of liquid between two adjacent tanks, the hydrostatic support system is also comprised of a plurality of corrugations 80 that are formed in the interior walls 62 and 64 and extend vertically between bottom wall 58 and the top wall 60 as shown for the interior wall 64 in FIGS. 4 and 6.

As has been noted above, an important consideration of the present invention is the rapidity with which the tank battery 30 can be emplaced at the site of an oil well and, at a later time, removed therefrom and the tank battery 30 is provided with a variety of features to facilitate emplacement and subsequent removal. In particular, the container 46 is mounted on a base frame 82 that is comprised of channel members 84 and 86 welded to the bottom wall 58 of the container 46 to extend the length of the container 46 along the sides thereof and channel members 85 and 87 that parallel the members 84 and 86. The members 84–87 protrude a short distance beyond the ends 32 and 34 and the base frame 82 further comprises plates 88 and 90 (FIG. 4) that are welded across the tops of the channel members 84–87 to exend along the ends of the container 46 and plates (not shown in the drawing) that are welded to the ends of the channel members and to the plates 88 and 90 to extend vertically across the ends 32 and 34 of the base frame 82. Thus, with the I beams 70 which are welded to the channel members 84–87, the base frame 82 provides a rigid support for the container 46 that enables the tank battery 30 to be emplaced at the site of an oil well with only a minimum of preparation of the oil well site prior to emplacement.

As shown in FIG. 4, apertures 88 are formed through the bottom wall 58 of the container 46 and a drain conduit 91 is welded about each of these apertures extended through holes (not shown) in the members 85 and 86 to provide a means of draining the tanks of the tank battery 30 prior to removal of the battery 30 from the site of an oil well. At such times that the tank battery 30 is located at the site of an oil well, valves 92 are screwed onto the ends of the drain conduits and the valves 92 are removed and replaced with caps (not shown) for transport of the tank battery 30 from the site of the oil well.

Additionally, emplacement of the tank battery 30 is facilitated by a plurality of protruding pipes 94 that are welded about holes formed through the top wall 60 and side walls 50 and 52 to facilitate the connection of fluid inlets and outlets to the tanks of the tank battery 30. (Only one pipe 94 has been numerically designated in each of FIGS. 1–6.) During transport, the pipes 94 are capped as has been indicated for various of the pipes 94 in FIG. 1 of the drawings. As will be clear to one skilled in the art, the fixed relationship between the tanks of the tank battery 30 and the pipes 94 by means of which connections between the tanks and to a fluid treatment system emplaced at the well site to separate the fluids issuing from the well into a gaseous component, an oil component, and a salt water component, permit the tank battery 30 to be placed in a condition for use using piping that is cut to size prior to transport of the tank battery 30 to the site of an oil well and transported to the site with the tank battery 30.

An additional feature of the tank battery 30 that facilitates the emplacement of the tank battery 30 at the site of an oil well is a folding catwalk 96 that is mounted on the side wall 50 of the container 46 of the tank battery 30 via the bolsters 68 welded on the side wall 50. Preferably, and as illustrated in FIGS. 2 and 4, the catwalk 96 is constructed in a series of identical sections to facilitate movement of the catwalk 96 between a folded position, shown in FIG. 1, in which the catwalk 96 is folded against the wall 50 of the tank battery 30 and a deployed position, shown in FIGS. 2 and 4, in which the catwalk 96 extends laterally from the wall 50 substantially the length of the tank battery 30. Thus, in the embodiment of the tank battery 30 shown in the drawings, the catwalk 96 is comprised of substantially identical first and second sections 98 and 100, constructional details of which have been illustrated in FIGS. 7–11.

Each of the sections 98 and 100 of the catwalk 96 is comprised of a base member 102 which, as particularly indicated for the base member 102 of the section 98 in FIGS. 4 and 10, is constructed of a rectangular framework of angle members 104–110 inside of which has been attached; for example, by welding, a sheet of heavy metal screen. The angle member 108, near the end 32 of the tank battery 30 is provided with apertured lugs (not numerically designated in the drawings) to which a stairway 112 can be pinned when the tank battery 30 is emplaced as indicated in FIG. 2.

In order to mount the base member 102 on the wall 50 of the tank battery 30, pairs of tube sections 114, only one of which has been illustrated in the drawings, are welded to the top of the angle member 104 to align with selected bolsters 68, as shown in FIG. 10, and bolts passing through the tube sections and a hole 115 (FIG. 9) formed through the bolster 68 provide a pivoting connection between the base member 102 and the bolster 68. Portions of the lower web 116 of the angle member 104, aligned with the tube sections 114, are cut away so that the base member 102 can pivot in a vertical arc between a lowered position in which the base member 102 hangs along the side wall 50 of the tank battery 30 and a raised position in which the base member 102 extends laterally from the side wall 50.

To maintain the base section 102 in the raised position, a plurality of supports 118 fabricated by bending circular steel rod into a right triangle, are pivotally mounted on the bolsters 68 to swing in a horizontal arc from a position in which the supports 118 extend along the wall 50 to a position in which the supports 118 extend laterally from the side of the tank battery 30 to underlay the base section 102. FIG. 9 illustrates the mounting of one of the triangular supports on a bolster 68 via tube section pairs 120 that are welded to the bolsters 68 to receive one leg of the support 118. The supports 118 are maintained in the extended position underlying the base section 102 by means of circular indentations 122 formed in the depending web of the angle member 106 to receive portions of the supports 118.

In addition to the base member 102, each of the sections 98 and 100 of the catwalk 96 is comprised of a hand rail 124 which is pivotally mounted on the base member 102 of the catwalk section in a manner that has been illustrated in FIGS. 2 and 8. The hand rail 124 is comprised of a top rail 126, constructed of square tubing, from which depend three legs 128-132 similarly constructed of square tubing and welded to the top rail 126. For mounting the hand rail 124 on the base member 102, connectors 134, constructed of square tubing of a size to fit about the legs of the hand rail 124, are welded to the angle member 106 of the base member 102 at intervals corresponding to the spacing of the legs 128-132 of the hand rail 124. Upper portions of the laterally positioned webs of the connectors 134 are cut away and the legs 128-132 are secured via bolts 138 and nuts 139, between longitudinally positioned webs of the connectors 134 via holes (not numerically designated in the drawings) formed through the connectors 134 and a slot 136 formed through each of the legs of the hand rail 124 parallel to the length thereof. Thus, the hand rail 124 can be moved to a position overlaying the base member 102 of the catwalk section 96 as illustrated in FIG. 1, or moved to a position extending perpendicularly to the base member 102, as shown in FIG. 2, by shifting the hand rail along the slots 136 in the legs 128-132 until the lower ends of the legs can be pivoted into the connectors 134 and then lowered to nest within the connectors 134.

The catwalk section 100 is substantially identical to the catwalk section 96 so that no description is necessary for the catwalk section 100. When the catwalk 96 is in the deployed position shown in FIG. 2, the two sections of the catwalk are secured together via a length of channel member 140 that is pivotally mounted on the top rail 126 of the hand rail 124. Additionally, and as shown in FIG. 11, tube sections 142 can be welded to legs of the hand rails nearest the ends of the tank battery 30, as illustrated for the leg 144, of the hand rail of the catwalk section 100 and similar tube sections 146 can be welded to the wall 50 of the tank battery 30 to receive depending lugs 148 of a guard rail 150 for mounting the guard rail 150 at one end of the catwalk 96 as shown in FIG. 5.

FIG. 7 illustrates for the leg 128 of the hand rail 124 of the catwalk section 96 a preferred manner of securing the catwalk 96 in the folded position against the wall 50 during transport of the tank battery 30. To this end, a plurality of tube sections 152 are welded to the wall 50 of the tank battery 30 to receive lengths of circular steel rod 154 that have been bent into the shape of an L so that a threaded portion of the rod 154 can be extended laterally from the wall 50, as illustrated in FIG. 7, or folded against the wall 50. Selected ones of the legs of the hand rails, for each of which is provided a tube 152 and a rod 154, are provided with U-shaped brackets 156 to receive the threaded end of the rod 154 so that a nut 158 on the rod 154 can be utilized to hold the catwalk 96 in the folded position shown in FIG. 1.

Referring now to FIGS. 12-15, the towing frame 38 is comprised of two longitudinally extending, parallel base beams 160 and 162 that are constructed of steel channel and connected together by braces 164-186 that are welded to the base beams 160 and 162 and extend laterally therebetween. Near a forward end 188 of the towing frame, a shallow, cup-shaped connector mount 190 is welded to the underside of the towing frame to support a connector 192 that can be mounted in the fifth wheel of a towing vehicle to support the towing frame 38 on rear portions of the towing vehicle as indicated in FIG. 1 in the drawings. As shown in FIGS. 12 and 14, the connector mount can be stiffened via a plurality of braces 194, only one of which has been numerically designated in the drawings, that are welded to the undersides of the braces 176-180 and to the connector mount 190.

Near its rear end 196, the towing frame is comprised of two square tubes 198 and 200 that are welded end-to-end to the base beams 160 and 162 respectively and extend longitudinally from the ends of the base beams 160 and 162 to the forward end 196 of the towing frame 38. Two depending legs 202 and 204 are welded to the inside of the tube 198 and, similarly, two depending legs 206 and 210 are welded to the inside of the tube 200 so that the legs 202-210 depend in a rectangular array from rear portions of the towing frame 38. As shown in FIGS. 13 and 14, a plurality of equally spaced, laterally extending holes (not numerically designated in the drawings) is formed through each of the legs 202-210 for a purpose that will be discussed below. The legs 202-210 are braced by laterally extending square tubes 212-218, brace plates 220 welded between the legs 202 and 204 and the legs 206 and 210, brace plates 222 welded to the tubes 212-218, brace plates 224 welded to the brace 164 and, for each brace plate, to one of the legs 204 and 210, and brace plates 230 welded to the brace 164 and the two tubes 214 and 218. Thus, the towing frame 38 is a rigid structure having four depending legs, the legs 202-210 attached to the rear end 196 thereof and depending in a rectangular array.

In addition to the towing frame 38, the structure mobilizing system 36 is further comprised of a first connecting frame 232 constructed as illustrated in FIGS. 16-18 to slide vertically on the legs 202-210. For this purpose, the first connecting frame 232 is comprised of two parallel side plates 234 and 236 that are connected together by a square tube 238 that is welded to facing sides of the plates 234 and 236 to extend therebetween. Vertically extending tubes 240-246 are welded to the facing sides of the side plates 234 and 236 in a rectangular array to receive the legs 202-210 respectively so that the first connecting frame can slide vertically on the legs of the towing frame 38 in a manner illustrated in FIGS. 23-25. Each of the tubes 240-246 is provided with a plurality of spaced holes (not numerically designated in the drawings), to match the holes formed through the legs 202-210, as illustrated in FIG. 18 for the tubes 240 and 242, and the holes through the tubes 240-246 are extended through the side plates 234 and 236 so that the position of the first connecting frame 232 on the towing frame 38 can be fixed by means of pins 241 (FIG. 1) inserted through the holes in the legs 202-210 and through the tubes and side plates of the first connecting frame 232. Alternatively, the pins 241 can be removed and, at such times that the towing frame 38 is supported on the fifth wheel of a towing vehicle, the first connecting frame 232 can be raised and lowered with respect to the earth's surface via hydraulic first jacks 248 and 250 mounted on the outside surfaces of the side plates 234 and 236 respectively.

The first connecting frame 232 can be coupled to one end of the tank battery 30 by means of a first coupling assembly, not generally designated in the drawings, having a first portion on the first connecting frame and a second portion on the end of the tank battery 30. (For purposes of illustration, the portion of the first coupling assembly mounted on the tank battery 30 has been illustrated as being on the end 32 of the tank battery 30. However, the first coupling assembly can be provided on either end of the tank battery 30.) The first portion of the first coupling assembly is comprised of two plates 249 and 251 that are formed integrally with the side plates 234 and 236 respectively, so that the plates 249 and 251 extend rearwardly of the rear end 196 of the towing frame 38 at such times that the connecting frame 232 is mounted on the legs 202-210 of the towing frame 38. The second portion of the first coupling assembly comprises two clevises 252 and 254, each comprised of a pair of spaced parallel plates, that are welded to the plate 88 extending across the end 32 of the tank battery 30 and to the end wall 54 of the container 46 of the tank battery 30. The clevises 252 and 254 are spaced to receive the plates 249 and 251 and a pair of vertically spaced holes is formed through each plate of the clevises 252 and 254 and through the plates 249 and 251 so that the connecting frame 232 can be connected to the end 32 of the tank battery 30 by inserting pins 253 and 255 (FIG. 23) through the holes of the plates and clevises of the first coupling assembly. The clevises 252 and 254 are rigidly supported on the end 32 of the tank battery 30 by braces 257 and 259 welded between the end wall 54 and bottom wall 58 in the interior of the container 46.

Referring now to FIGS. 1 and 19-22, the dolly 42 of the structure mobilizing system 36 is comprised of a frame 256 supported on an axle 258 via conventional spring mounts 260. The wheels 44 are mounted on the ends of the axle 258 to support the frame 256 on the earth's surface for rolling movement of the dolly 42 along a roadway. Sheet metal shrouding welded on the frame 256 includes a forward panel 262 on a forward end 264 of the dolly 42 and a rear panel 266 on a rear end 268 for the attachment of signal lights, reflectors and the like on both ends 264 and 268 of the dolly 42 for the purpose that will become clear below. In particular, both ends of the dolly 42 can be provided with a set of signal lights 270 that comply with highway use regulations for rear ends of trailers.

As particularly illustrated in FIG. 21, two clevises 272 and 274, each comprised of a pair of spaced apart, parallel plates, are welded to the frame 256 to protrude from the forward end 264 of the dolly 42. Each of the clevises 272, 274 is provided with a pair of vertically spaced holes (not shown in the drawings) that extend laterally through the clevises to receive pins 276 and 278 that extend through the upper and lower holes respectively, of each of the clevises. The upper pins 276 provide a means of pivotally mounting a second connecting frame 280 of the structure mobilizing system 36 on the forward end 264 of the dolly 42. The second connecting frame 280 is comprised of two spaced apart, parallel plates 282 and 284 that are held together by means of a square tube 286 that is welded to facing sides of the side plates 282 and 284 to extend therebetween and form the second connecting frame into a single structure. The length of the square tube 286 is selected such that the side plates 282 and 284 are spaced a distance to fit within the clevises 272 and 274, as shown in FIG. 21, and, as shown in FIG. 22 for the side plate 284, a plurality of vertically spaced holes (not numerically designated in the drawings) is formed through each of the side plates 282 and 284 to match selected pairs of the holes through the side plates with the holes through the clevises 272 and 274 at such times that the side plates 282 and 284 are positioned within the clevises 272 and 274. Thus, the second connecting frame 280 can be pivotally mounted on the dolly 42 by extending the pins 272 through the upper holes in the clevises 272 and 274 and through holes in the side plates 282 and 284. Additionally, the second connecting frame 280 can be fixed against pivotation by extending the pins 278 through the lower holes in the clevises 272 and 274 and through one other hole formed through the side plates 282 and 284. Second jacks 283 and 285 are mounted on the side plates 282 and 284 respectively, for raising and lowering the second connecting frame with respect to the earth's surface as will be discussed below.

The second connecting frame 280 can be connected to one end of the tank battery 30 by means of a second coupling assembly, not numerically designated in the drawings, having a first portion on the second connecting frame and a second portion on one end of the tank battery 30. Such end of the tank battery 30 is the end opposite that to which the towing hitch is coupled so that, in the case in which the towing hitch 38 is coupled to the end 32 of the tank battery 30 as illustrated in FIG. 1, the dolly 42 will be coupled to the end 34 of the tank battery 30. The first portion of the second coupling assembly is identical to the first portion of the first coupling assembly used to connect the towing hitch 38 to the tank battery 30; that is, the first portion of the second coupling assembly is comprised of two plates 288 and 290 that are formed unitarily with the side plates 282 and 284 respectively, to extend forwardly of the second connecting assembly 280 as particularly shown in FIGS. 21 and 22. Similarly, the second portion of the second connecting assembly is comprised of two spaced apart, parallel clevises 292 and 294 (FIG. 4) that are welded to the plate 90 and the end wall 56 of the tank battery 30 to receive the plates 282 and 290 respectively. A pair of vertically spaced holes is formed through each of the plates 288 and 290 and clevises 292 and 294 so that the connecting frame 280 can be coupled to the end 34 of the tank battery 30 by means of pins 295 and 297 inserted through the holes in the plates 288 and 290 and the clevises 292 and 294 at such times that the plates 288 and 290 are positioned within the clevises 292 and 294. For a purpose to be discussed below, the dolly 42 is further provided with a third coupler that is mounted on the rear end 268 of the dolly and is comprised of a pair of clevises 296 and 298 that are spaced identically to the spacing of the clevises 252 and 254 of the first coupling assembly and are each provided with a pair of vertically spaced holes (not numerically designated in the drawings) that are spaced to align with the holes formed through the plates 249 and 251 that comprise the first portion of the first coupling assembly used to couple the towing hitch 38 to the end 32 of the tank battery 30. As in the case of the clevises 252 and 254 on the end 32 of the tank battery 30, the clevises 292 and 294 are rigidly fixed in position on the end 34 of the tank battery 30 by internal braces 300 and 302 that are welded between the end wall 56 and bottom wall 58 of the container 46 in alignment with the clevises 292 and 294 as illustrated in FIG. 4.

Emplacement of the Tank Battery

FIG. 1 and FIGS. 23-26 illustrate the manner in which the mobile storage tank battery of the present invention can be rapidly emplaced at the site of an oil well. Referring first to FIG. 1, wherein the mobile storage tank battery 30 has been illustrated in a transport mode thereof, transport of the mobile storage tank battery 30 is accomplished while the base frame 82 of the battery 30 is raised a distance above the earth's surface 261 by the towing hitch 38 and the dolly 42. In particular, during transport of the tank battery 30, the first connecting frame 232 is held in a raised position on the legs of the towing hitch 38 by pins 241 and the first jacks on the first connecting frame 232 are in a contracted condition as shown for the first jack 250 in FIG. 1. The pins 253 and 255 of the first coupling assembly couple the portions of the coupling assembly on the connecting frame 232 and the base frame 82 together so that, with the mounting of the towing hitch 38 on the fifth wheel of a truck 40, the end 32 of the tank battery 30 is held above the earth's surface 261 by the towing hitch 38 and truck 40. At the opposite end 34 of the tank battery 30, the pins 295 and 297 of the second coupling assembly couple the two portions of the second coupling assembly together and the second connector assembly 280 is coupled to the dolly 42 via the two pins 276 and 278 to form a rigid support for the end 34 above the earth's surface 261 by the dolly 42. With the mobile storage tank battery in this transport mode, the truck 40 can be utilized to move the storage tank battery 30 to the site of a well at which the storage tank battery 30 is to be emplaced.

Referring now to FIGS. 23-25, emplacement is initiated by extending the first and second jacks (the first jack 250 and second jack 283 are shown in FIGS. 23-25) so that support of the mobile storage tank battery 30 is shifted from the towing hitch 38 and dolly 42 to the jacks mounted on the connecting frames 232 and 280. Once the weight of the tank battery has been so shifted, the pins 241 that secure the first connecting frame 232 to the legs of the towing hitch 38 are removed so that the first connecting frame 232 is free to slide on the legs 202-210. Similarly, the pins 272 passing through the lower holes of the clevises 272 and 274 on the forward end of the dolly 42 are removed so that the second connecting frame 280 is free to pivot about the pins 276 passing through the upper holes of the clevises 272 and 274. With the pins 241 and 278 removed, the first jacks 248 and 250 and the second jacks 283 and 285 are contracted to lower the mobile storage tank battery 30 to the earth's surface 261, as shown in FIG. 24, while the first connecting frame 232 drops on the legs 202-210 of the towing hitch 38 and the dolly 42 pivots about the pins 276 through the upper holes in the clevises 272 and 274.

The pins 253 and 255 of the first coupling assembly are then removed and the jacks 248 and 250 are extended to raise the first connecting assembly 232 on the legs 202-210 of the towing hitch 38 so that the pins 241 can be reinserted through the holes in the side plates of the first connecting assembly 232 and the legs 202-210 to secure the first connecting assembly 232 to the towing hitch 38 as shown in FIG. 25. Similarly, the pins 295 and 297 of the second coupling assembly are removed and the jacks 283 and 285 are extended to pivot the dolly 42 to a level position that will permit reinsertion of the pins 278 that connect the second coupling assembly 280 to the clevises 272 and 274 on the forward end of the dolly 42. At this point, the mobile storage tank battery 30 will be resting on the earth's surface 261 free of the towing hitch 38 and the dolly 42.

Once the mobile storage tank battery 30 has been freed of the towing hitch 38 and dolly 42, it is contemplated that the towing hitch 38 and the dolly 42 will be removed from the site of the well for use in transporting another mobile storage tank battery 30 and, further, to avoid the possibility of theft of the towing hitch 38 and the dolly 42. To this end, the jacks 248 and 250 on the towing hitch 38 are contracted so that the towing hitch 38 is supported on the fifth wheel of the truck 40 and the truck 40 is driven about the mobile storage tank battery 30 to bring the rear end 196 of the towing hitch 38 into a facing relation with the rear end 268 of the dolly 42. The truck 40 is then backed toward the dolly 42 to insert the plates 249 and 251 of the first coupling assembly on the first connecting assembly 232 into the clevises 296 and 298 mounted on the rear end 268 of the dolly 42. Pins 304 and 306 are then inserted through each of the plates of the first coupling assembly and each of the clevises 296 and 298 to secure the first coupling frame 232 to the rear end of the dolly 42. With the dolly 42 thus secured to the towing hitch 38, the hydraulic jacks 283 and 285 on the second connecting frame 280 are contracted so that the towing hitch 38 and dolly 42 can be towed from the site of a well in a configuration illustrated in FIG. 26 by the truck 40.

Once the towing hitch 38 and dolly 42 have been removed from the ends of the mobile storage tank battery 30, the mobile storage tank battery 30 is rapidly placed in operation by deploying the catwalk 96 and connecting pre-fitted pipes to selected ones of the pipes 94 on the sides and top of the tank battery 30. Initially, with reference to FIG. 7, the nuts 158 are removed from the rods 154 to permit the hand rail 124 of each of the catwalk sections 98 and 100 to be positioned in a normally extending relation to the base members 102 of the catwalk sections 98 and 100 in the manner that has been described above. Each base member 102 of the catwalk sections 98 and 100 are then moved in a vertical arc to the raised position shown in FIGS. 2 and 4 and the supports 118 for the catwalk are swung in a horizontal arc to fix the base members 102 of the catwalk sections 98 and 100 in the raised position thereof. Final deployment of the catwalk is then carried out by mounting the guard rail 150 at one end of the catwalk 96 and pinning the stairway 112 to the other end thereof as has been described above.

Once the catwalk has been deployed, pre-fitted pipes 310 are connected to selected pipes 94 extending from the top of the tank battery 30 via valves 312, 314 and 316 to provide for inlet of oil into selected ones of the tanks of the tank battery 30. Such oil can be supplied via a pipe 318 that extends, for example, to the oil outlet pipe of a heater-treater commonly emplaced at the site of an oil well to separate oil from water produced by the well. Similarly, selected ones of the tanks can be utilized to store salt water by making an appropriate connection to one of the pipes 94 on the top of the storage tank battery 30 as has been indicated at 320 in FIG. 2. Completion of the preparation of the storage tank battery 30 for use is then carried out by mounting a gas vent line 322 on other of the pipes 94 at the top of the mobile storage tank battery 30, connecting suitable outlets 324 and 326, including valves 328–332 to selected ones of the pipes 94 mounted on the first side wall 50, connecting valved overflow conduits 334 and 336 to other selected pipes 94 to provide selective communication between upper portions of the tanks and the tank battery 30, as shown in FIG. 2, and by mounting the valves 92 on the drain conduits 91 as shown in FIG. 3.

It will thus be seen that the present invention provides a storage tank battery that can be rapidly and easily transported to the site of an oil well and rapidly deployed at the site. It is therefore clear that the present invention is well adapted to carry out the objects and attain the ends and advantages mentioned as well as those inherent therein. While a presently preferred embodiment of the invention has been described for purposes of this disclosure, numerous changes may be made which will readily suggest themselves to those skilled in the art and while are encompassed within the spirit of the invention disclosed and as defined in the appended claims.

What is claimed is:

1. A mobile storage tank battery, comprising:
   a rectangular container having external walls enclosing the interior of the tank battery and at least one internal wall dividing the container into separate tanks of the tank battery, wherein the external walls comprise:
   two spaced apart, substantially parallel, planar, rectangular side walls;
   two spaced apart, substantially parallel, planar end walls, each end wall attached to one end of both side walls and extending between the side walls, wherein each internal wall is positioned in a substantially parallel relation to the end walls, whereby each tank of the tank battery is provided with a substantially constant lateral cross section from the lower edges of the side walls to the upper edges thereof;
   a top wall attached to the upper edges of the side walls and end walls; and
   a bottom wall attached to the lower edges of the side walls and the end walls;
   means, on the walls of the container, for supporting hydrostatic pressure of liquids in the tanks of the tank battery;
   a detachable towing frame connected to one end of the container; and
   a detachable dolly connected to the opposite end of the container.

2. The tank battery of claim 1 wherein the means for supporting hydrostatic pressure of liquids in the tanks of the tank battery comprises:
   a plurality of vertical corrugations formed in each internal wall of the container;
   a plurality of vertically extending, external bolsters welded to the external walls of the container; and
   a plurality of horizontally extending internal bolsters welded to the external walls of the container in alignment with selected external bolsters and extending across the top of the container.

3. The tank battery of claim 2 further comprising a plurality of rods attached at opposite ends thereof to opposing external walls of the container and extending laterally across the interior of the container.

4. The tank battery of claim 1 further comprising a plurality of rods attached at opposite ends thereof to opposing external walls of the container and extending laterally across the interior of the container.

5. The tank battery of claim 1 wherein the external walls of the container include a bottom wall having a V-shaped cross section; wherein an aperture for each tank of the tank battery is formed through the bottom wall of the tank battery at the apex of the V; and wherein the tank battery further comprises a drain conduit for each tank of the tank battery, each drain conduit welded to the bottom wall of the tank battery about an aperture formed therethrough and extending laterally along the bottom wall of the tank battery to protrude laterally of the container.

6. A System for mobilizing a structure for transport to a site of use by a towing vehicle, comprising:
   a towing frame supported during transport of the structure on the towing vehicle, the towing frame having a rear portion extending rearwardly of the towing vehicle;
   a first connection frame slidable mounted on the towing frame for vertical movement on the rear portion of the towing frame;
   means for pinning the first connection frame against sliding movement on the towing frame;
   first coupling means for coupling the first connection frame to one end of the structure;
   first jack means mounted on the first connection frame for vertically positioning the first connection frame with respect to the earth's surface;
   a wheeled dolly;
   a second connection frame pivotally mounted on one end of the dolly;
   means for pinning the second connection frame against pivotation on the dolly;
   second coupling means for coupling the second connection frame to the opposit end of the structure; and
   second jack means mounted on the second connection frame for vertically positioning the second connection frame with respect to the earth's surface.

7. The system of claim 6 wherein the first coupling means comprises:
   a first portion mounted on the first connection frame;
   a second portion mounted on said one end of the structure; and
   means for detachably connecting the first portion of the first coupling means to the second portion of the first coupling means; and wherein the system further comprises third coupling means mounted on the end of the dolly opposite the end thereof whereon the second connection frame is mounted and constructed identically to the second portion of the first coupling means for connection of the first connection frame to the dolly.

8. The system of claim 6 wherein each of the first coupling means and the second coupling means comprises:
- a pair of spaced apart, parallel, apertured connecting plates mounted on one of the connection frames;
- a pair of spaced apart, parallel, apertured clevises mounted on one end of the structure to receive the connection plates on one of the connection frames; and
- a plurality of pins insertable through the apertures of the connection plates and the clevises for securing the connection plates within the clevises.

9. A connecting frame for connecting a structure to a transportation support comprising:
- two spaced apart, substantially parallel sideplates;
- a jack mounted vertically on each of the plates for raising and lowering the frame with respect to the earth's surface; and
- means for pinning the sideplates of the connecting frame to the structure and the transportation support.

10. An apparatus for connecting a structure to a towing vehicle, comprising:
- a towing frame having a fifth wheel connector near a foward end thereof for support of the towing frame on a fifth wheel of the towing vehicle, the towing frame having a rear portion extending rearwardly of the towing vehicle and a plurality of legs depending from the rear portion of the towing frame;
- a connection frame comprised of a plurality of tubular members slidably mounted on said depending legs of the towing frame for vertical movement of the connection frame on the rear portion of the towing frame;
- means for pinning the connection frame against vertical movement on the towing frame;
- coupling means for coupling the connection frame to one end of the structure; and
- jack means mounted on the connection frame for vertically positioning the connection frame with respect to the earth's surface.

11. A dolly for supporting one end of a structure for transport, comprising:
- a wheeled frame;
- a connection frame pivotally mounted on one end of the wheeled frame;
- means for pinning the connection frame against pivotation on the wheeled frame;
- means for coupling the connection frame to one end of the structure; and
- jack means mounted on the connection frame for vertically positioning the connection frame with respect to the earth's surface.

12. A mobile storage tank battery, comprising:
- a rectangular container having external walls enclosing the interior of the tank battery and at least one internal wall dividing the container into separate tanks of the tank battery;
- means, on the walls of the container, for supporting hydrostatic pressure of liquids in the tanks of the tank battery;
- a detachable towing frame connected to one end of the container;
- a detachable dolly connected to the opposite end of the container; and
- a catwalk mounted on one of the external walls of the container, the catwalk comprising:
  - at least one base member, pivotally connected at one side thereof to said one of the external walls for pivotation in a vertical arc, whereby the base member can be pivoted between a raised position wherein the base member extends laterally from said one of the external walls and a lowered position wherein the base member extends along said one of the external walls;
  - a plurality of supports pivotally connected below the base member to said one of the external walls of the container for pivotation in a horizontal arc, whereby each support can be pivoted between a support position underlying the base member in the raised position thereof and a storage position wherein the support extends along said one of the external walls of the container; and
  - a detachable stairway connected to one end of the base member.

13. The tank battery of claim 12 wherein the catwalk further comprises:
- a hand rail for each base member;
- means for connecting the hand rail to the side of the base member opposite the side thereof connected to the external wall of the container for alternative vertical pivotation of the hand rail on the base member and perpendicular extension of the hand rail from the base member in a direction such that the hand rail will extend vertically from the base member in the raised position of the base member, whereby the hand rail can be extended vertically along the outside of the catwalk in the raised position of the base member and folded to overlay the base member in the lowered position of the base member; and
- means for securing the hand rail to said one of the external walls of the container at such times that the base member is in the lowered position thereof and the hand rail is folded to overlay the base member.

14. A mobile storage tank battery, comprising:
- a rectangular container having external walls enclosing the interior of the tank battery and at least one internal wall dividing the container into separate tanks of the tank battery;
- means, on the walls of the container, for supporting hydrostatic pressure of liquids in the tanks of the tank battery;
- a detachable towing frame connected to one end of the container;
- a detachable dolly connected to the opposite end of the container;
- a first connection frame slidably mounted on the towing frame for vertical movement on the towing frame;
- means for coupling the first connection frame to one end of the tank battery;
- first jack means mounted on the first connection frame for vertically positioning the first connection frame with respect to the earth's surface;
- a second connection frame pivotally mounted on one end of the dolly;
- a means for coupling the second connection frame to the opposite end of the tank battery; and
- second jack means mounted on the second connection frame for vertically positioning the second connection frame with respect to the earth's surface.

* * * * *